(12) United States Patent
East et al.

(10) Patent No.: US 11,816,420 B2
(45) Date of Patent: Nov. 14, 2023

(54) AUTOMATIC TEMPLATE AND LOGIC GENERATION FROM A CODIFIED USER EXPERIENCE DESIGN

(71) Applicant: Dell Products, L.P., Hopkinton, MA (US)

(72) Inventors: Patrick East, Arvada, CO (US); Sumedh Sathaye, Austin, TX (US); Jennifer Minarik, Zionsville, IN (US); Reut Kovetz, Tel Aviv (IL); Kelly Lisai, Austin, TX (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/719,633

(22) Filed: Apr. 13, 2022

(65) Prior Publication Data
US 2023/0334227 A1 Oct. 19, 2023

(51) Int. Cl.
*G06F 40/143* (2020.01)
*G06F 40/186* (2020.01)
*G06F 40/169* (2020.01)

(52) U.S. Cl.
CPC .......... *G06F 40/143* (2020.01); *G06F 40/169* (2020.01); *G06F 40/186* (2020.01)

(58) Field of Classification Search
CPC ..... G06F 40/143; G06F 40/186; G06F 40/169
See application file for complete search history.

(56) References Cited

U.S. PATENT DOCUMENTS

| | | | |
|---|---|---|---|
| 5,394,347 A * | 2/1995 | Kita ............... | G01R 31/318371 703/2 |
| 7,133,908 B1 * | 11/2006 | Pajak ..................... | H04L 41/22 709/224 |
| 9,565,246 B1 * | 2/2017 | Tsypliaev ............. | G06Q 10/107 |
| 2003/0135501 A1 * | 7/2003 | Frerebeau ............... | G06F 9/454 |
| 2005/0162446 A1 * | 7/2005 | Worrell .................... | G09G 5/00 345/660 |
| 2006/0161833 A1 * | 7/2006 | Chandra ............. | G06F 11/3688 714/763 |
| 2008/0098300 A1 * | 4/2008 | Corrales ............... | G06F 16/986 707/E17.118 |
| 2008/0133716 A1 * | 6/2008 | Rao ........................ | H04L 67/306 709/227 |

(Continued)

*Primary Examiner* — Thu V Huynh
(74) *Attorney, Agent, or Firm* — Anderson Gorecki LLP (57) ABSTRACT

An automated template and logic generator retrieves a codified user experience design having persona and outcome metadata and a finite state machine. An aggregation engine walks the finite state machine, identifies objects in each state, and selects components that correspond with the objects from a component library. Actions associated with the components are identified, and used to identify API calls that are required to be made to implement the actions. Corresponding APIs are aggregated to create a back-end for front-end (BFF) layer for the codified user experience definition. A pattern is created for a front-end layer for the codified user experience design based on the FSM. A code generator builds components to the objects of the codified user experience design to generate precompiled code, which is packaged with a node.js layer to allow local runtime. The generated precompiled code is versioned and placed in the user experience design repository.

14 Claims, 7 Drawing Sheets

(56) References Cited

U.S. PATENT DOCUMENTS

| | | | |
|---|---|---|---|
| 2014/0281891 A1* | 9/2014 | Sulcer | G06F 3/0484 |
| | | | 715/234 |
| 2015/0324211 A1* | 11/2015 | Kuroda | G06F 9/448 |
| | | | 713/100 |
| 2016/0162263 A1* | 6/2016 | Brunswig | G06F 8/71 |
| | | | 717/101 |
| 2021/0110345 A1* | 4/2021 | Iyer | G06Q 10/0633 |
| 2021/0165690 A1* | 6/2021 | Mohalik | G06F 9/542 |

* cited by examiner

FIG. 1

Example Experience Definition

FIG. 6
Code generation

FIG. 7A

Create Storage Volume — 710

Enter Name of Storage Volume: [    ] 715

Enter Size of Storage Volume: [    ] 720

[ Create! ] 725

Create Storage Volume — 710

Enter Name of Storage Volume: [ AG1234 ] 715

Enter Size of Storage Volume: [ 5GB ] 720

[ Create! ] 725

700
705

AUTOMATIC TEMPLATE AND LOGIC GENERATION FROM A CODIFIED USER EXPERIENCE DESIGN

FIELD

This disclosure relates to computing systems and related devices and methods, and, more particularly, to a method and apparatus for automatic template and logic generation from a codified user experience design.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

An automated template and logic generator retrieves a codified user experience design having persona and outcome metadata and a finite state machine. An aggregation engine walks the finite state machine, identifies objects in each state, and selects components that correspond with the objects from a component library. Actions associated with the components are identified, and used to identify API calls that are required to be made to implement the actions. Corresponding APIs are aggregated to create a back-end for front-end (BFF) layer for the codified user experience definition. A pattern is created for a front-end layer for the codified user experience design based on the FSM. A code generator builds components to the objects of the codified user experience design to generate precompiled code, which is packaged with a node.js layer to allow local runtime. The generated precompiled code is versioned and placed in the user experience design repository.

By aggregating API data from a codified user experience design, it is possible to build a back-end layer to implement the codified user experience design on the intended product. The aggregated data can be used to generate an HTML template of the corresponding components at the intended locations, creating a fully-functioning front-end layer to implement the codified user experience design. This enables a software developer to be given a fully-functioning package which can be plugged into a product and modified for product-specific use cases.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Storage systems are used to provide storage services for host applications. When a host application wants to have data stored on a given storage system, the necessary storage volumes are created on the storage system by interacting with a user interface to the storage system. Humans can interact with the storage system, and likewise other automated processes can interact with the storage system.

Any interaction, whether it be between a human actor and a machine such as a storage system, or between two computer implemented systems, constitutes a "user experience" with a product. User experience design is the process of supporting user behavior through usability, usefulness, and desirability provided in the interaction with a product. Although an example system for codifying user experience designs and managing the codified user experience designs will occasionally be described in the context of codifying and managing user experience designs that are configured to enable users and storage systems to interact, it should be understood that embodiments may be used in many contexts, and are not limited to use in the context of codifying and managing user experience designs in the context of a storage system.

An example of a user experience design might be, for example, a Graphical User Interface (GUI) component or set of screens that are configured to enable a user to access a particular feature on a storage system. User experiences are designed, for example using design systems 100, to enable the graphical user interface to be used to achieve a particular objective. In the context of a GUI that is used to interface a software program, the term "user experience design", as used herein, is used to refer to a set of graphic components and transitions between states that enable a user to navigate, through the GUI, to enable the user to access the intended feature of the software program. In the context of a CLI, the term "user experience design" is used to refer to a selected set of scripts that are arranged in a package, in which each package contains an ordered set of API calls and input parameters, that are arranged to enable the user to access the intended objective. In the context of an API, the term "user experience design" is used to refer to a selected set of files that are arranged in a playbook, in which each file contains an ordered set of API calls and input parameters, that enable the user to access the intended objective.

Conventionally, user experience designs would be created by experience designers. For example, if a new feature is to be added to a software product, and the software product has a graphical user interface (GUI), often the GUI will need to be modified to enable the users to access the new feature of the software product. Stated differently, a new user experience will need to be created (designed) to enable the user to access the new feature of the software product. To create the new user experience, a software interaction design professional would create a version of how the GUI may be configured, to enable a person to access the new feature through the software product's GUI. The initial version of the changes to the GUI might be created by the design professional using a design tool such as Figma, Adobe XD, Sketch, or by manually diagramming the GUI experience.

The user experience design would then be reviewed by the design professionals, the product managers responsible for enabling the new feature in the software product, the product architects responsible for designing and including the new feature in the software product, and engineers responsible for actually implementing the GUI from the mockup provided by the design professional. After agreeing on the details of the user experience design, the engineers would implement the user experience design in software to add the user experience design to the software product GUI. The GUI would then be tested to ensure that the new feature of the product is actually accessible via the GUI. Often this process would iterate multiple times from any stage back to the original design phase, which can cause delays in implementing new features in the software product. Additionally, where the new feature is intended to be accessed using multiple different user experience designs, such as by a CLI as well as a GUI, each of the user experience design would need to go through this process.

Moreover, the conventional process of creating user experience designs is a manual process that requires each participant to keep track of the latest version of the user experience design. In an environment where the user experience design is changing frequently, for example due to architecture changes, implementation approach changes, or due to market/customer requirement changes, this may be difficult to implement. For example, the design professionals and product development team may revise a user experience design, but the engineers tasked with implementing the user experience design may be working on an earlier version of the user experience design.

In related U.S. patent application Ser. No. 17/577,542, filed Jan. 18, 2022, entitled Method and Apparatus for Codifying User Experience Designs and Managing the Codified User Experience Designs, an Experience Design Codification and Management System (EDCMS) system is described. The content of U.S. patent application Ser. No. 17/577,542 is hereby incorporated herein by reference.

Specifically, U.S. patent application Ser. No. 17/577,542, describes a method and apparatus that is configured to retrieve a user experience definition 175 based on the user experience design from an external design system 100, and generate a comprehensive user experience specification 180 from the user experience definition 175. Part of the comprehensive user experience specification 180 includes HTML, JavaScript and Cascading Style Sheets (CSS) describing the graphical aspects of the user experience design, as well as JavaScript Object Notation (JSON), eXtensible Markup Language (XML) or YAML code created based on the finite state machine generated from the user experience definition 175. The EDCMS 195 then packages and encodes the comprehensive user experience specification to create a codified user experience design 185 from the comprehensive user experience specification 180. The codified user experience design 185 is then versioned and digitally signed, and the versioned and signed codified user experience design 190 is stored in a user experience design repository 145.

By automatically generating a codified user experience design 185 from a user experience design 170, it is possible to provide engineers with a codified version of the intended user experience design 170, which includes HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented. This eliminates communication errors that might occur between the design professionals and engineers, because the engineers are automatically provided with a packaged and encoded codified user experience design 185, that is generated from the user experience design 170. By signing and versioning the codified user experience specification 190, and automatically entering the signed and versioned codified user experience 190 in a user experience design repository 145 where it can then be checked out/ checked in, as necessary, it is possible to ensure that everyone is working to implement the correct version of user experience design 170. This facilitates collaboration by preventing different members of the design team from working toward implementation of different versions of the user experience design 170.

Figure 1:
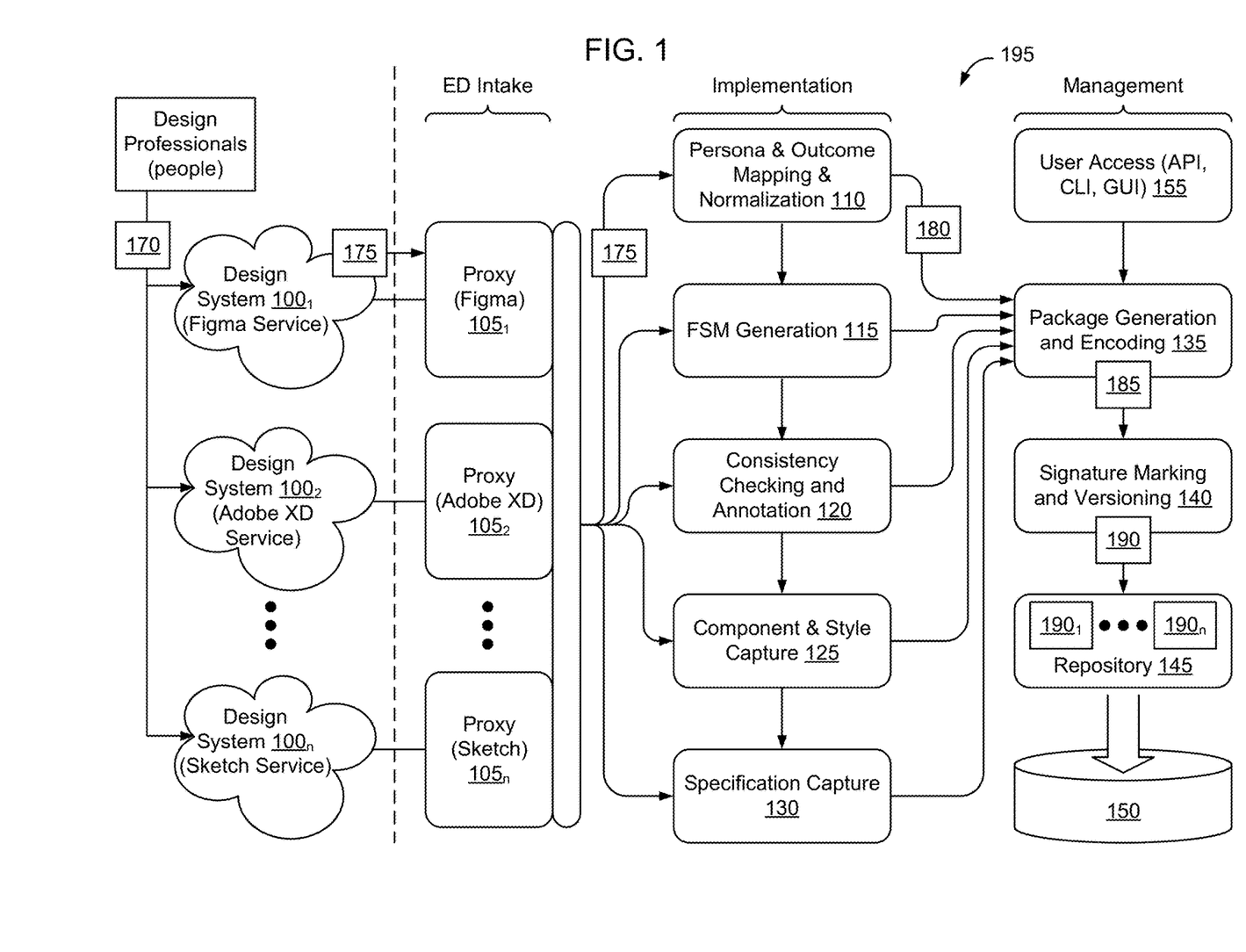
FIG. 1 is a functional block diagram of an example Experience Design Codification and Management System (EDCMS) interfaced with external user experience design systems, according to some embodiments.

FIG. 1 is described in greater detail in U.S. patent application Ser. No. 17/277,542, and is a functional block diagram of an example Experience Design Codification and Management System (EDCMS) 195, according to some embodiments. As shown in FIG. 1, in some embodiments design professionals (people) use existing experience design tools 100 to create user experience designs 170. Example existing design tools include design systems $100_1$-$100_n$, which might be for example an online design system tool such as Figma $100_1$, Adobe XD $100_2$, or a Sketch $100_n$. Many external design systems 100 might be used, depending on the implementation. Additionally, in some embodiments, user experience designs may be created manually, i.e., without the help of tools such as Figma or Adobe XD, and then processed by a proxy 105 configured to perform image processing of the manually created design. It should be noted that the design systems $100_1$-$100_n$, are outside of the EDCMS 195, as indicated by the vertical dashed line separating the external design systems 100 from the components of the EDCMS 195.

In some embodiments, the EDCMS 195 includes an experience design intake section configured to interact with the design systems $100_1$-$100_n$, to retrieve user definitions 175 based on the user experience designs 170 that have been created by the design professionals using these external systems 100. For example, in some embodiments the EDCMS 195 includes a set of proxies $105_1$-$105_n$ configured to interact with each respective design system $100_1$-$100_n$. As an example, if the Figma Service (design system $100_1$) enables external access at a particular URL, the Figma proxy $105_1$ may be configured to access the external Figma Service URL, request a design created by a particular design professional or team of design professionals, and then download the requested user experience definition 175. In some embodiments, each proxy operates in a stateless manner, and makes use of publicly available API interfaces for the experience design platforms 100. Although FIG. 1 shows a one-to-one correspondence between proxy 105 and design system 100, it should be understood that in some embodiments a given proxy 105 may be configured to interact with more than one design system 100, or that a single proxy 105 may be used to interact with all of the design systems 100.

According to some embodiments, the EDCMS 195 is configured to require the design professional to include experience metadata 250 (see FIG. 2) describing the intended environment of the software interaction experience.

Figure 2:
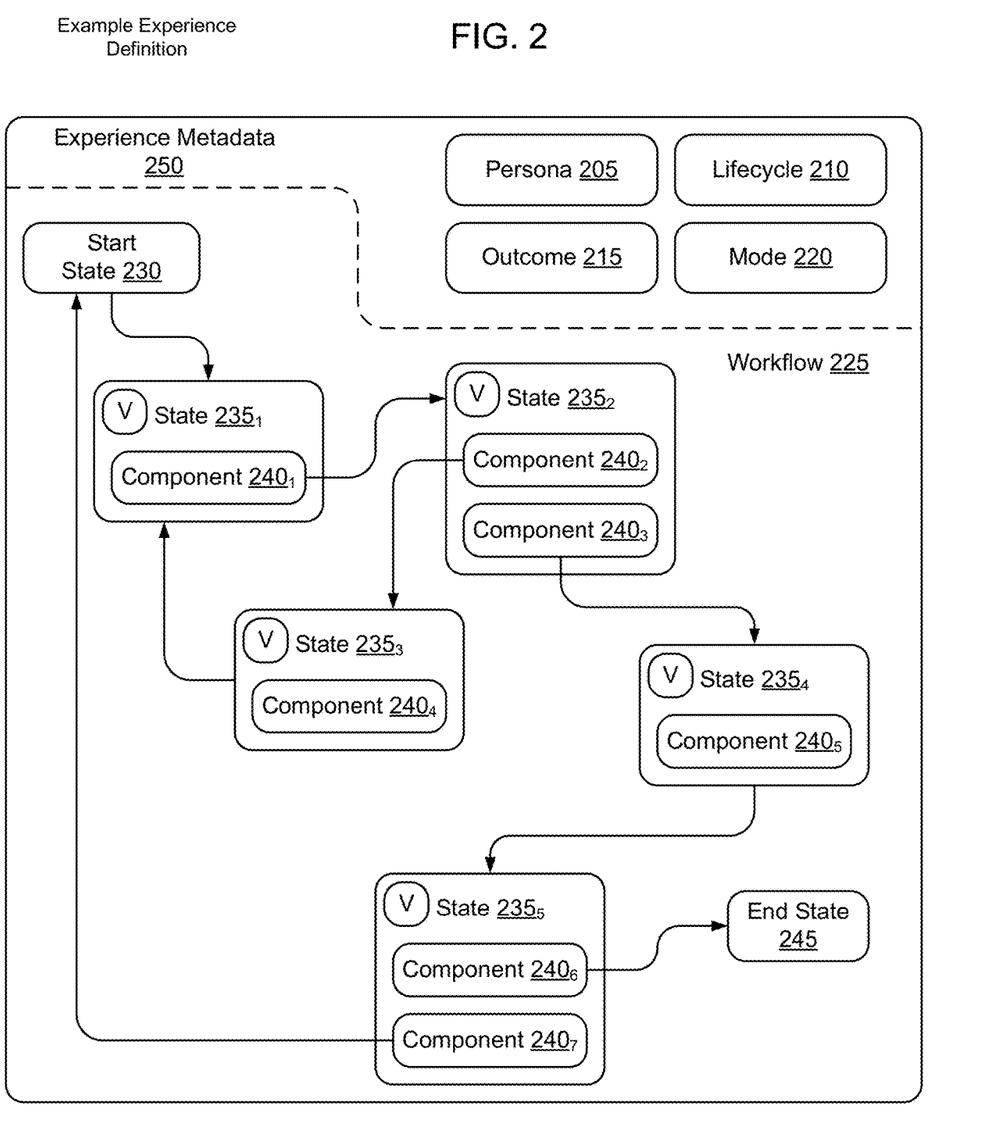
FIG. 2 is a functional block diagram of example experience design metadata, according to some embodiments.

The experience metadata 250, in some embodiments, includes information about who (the persona 205) the software interaction experience is being designed for. Different types of software users (different personas) might be provided with different software interaction experiences. For example, a system administrator may be given a different set of experiences than a normal user. Other personas might be a data center manager, network manager, software engineer, or other similar title. Personas may also be specified by capturing what the roles do, such as server administrator, storage administrator, backup administrator, filesystem user, auditor, security administrator, etc. In addition to specifying the persona 205, in some embodiments the experience metadata 250 also includes information about when, in the product lifecycle 210, the person specified in the persona metadata 205 is expected to encounter the software interaction experience.

In some embodiments, the experience metadata 250 includes information about the intended outcome of the user experience design 170. An "outcome", as that term is used herein, is used to refer to the objective of the software interaction experience. For example, if the software interaction experience has been created to enable a user to create a storage volume on a storage system, that would be the "outcome" that the design professional would specify in the outcome 215 aspect of the experience metadata 250. Other outcomes might include initial configuration of a system, setting up sub-tenants on a leased storage system, creating and mapping Logical Unit Numbers (LUNS) to hosts, monitoring system behavior, creating custom dashboards, etc. Many possible outcomes exist, although it would also be expected that there would be many similar outcomes that design professionals would create for different software products.

In some embodiments, the experience metadata 250 includes information about the particular mode of consumption 220, i.e., how a user is to be presented with the software interaction experience. Example modes 220 might include a Graphical User Interface (GUI) such as on a browser or on a mobile application, an Application Program Interface (API), a Command Line Interface (CLI), a Continuous Integration/Continuous Delivery (CI/CD) system, or another form or mode of consumption of a user experience.

In some embodiments, the experience metadata 250 includes information about how the experience is achieved. This is the workflow 225 that is used to achieve the intended outcome. For a GUI based user experience design 170, the workflow specifies the human interaction with screen states and transitions between states.

FIG. 2 is a functional block diagram of example experience design metadata 250, according to some embodiments. As shown in FIG. 2, in some embodiments the user experience definition 175 metadata 250 includes the persona 205, lifecycle 210, outcome 215, and mode of consumption 220. In addition, the user experience definition 175 metadata 250 includes workflow metadata 225 specifying a series of states 230, transitions between states, components 240, and variability information (V).

In the example workflow 225 shown in FIG. 2, the workflow metadata 225 specifies a start state 230 and a subsequent transition to state $235_1$. In the context of a GUI, the start state might be encountered when the user starts the software application and state $235_1$ might be displaying an initial screen on the GUI that includes component $240_1$. The workflow metadata 225 specifies that, when the user interacts with component $240_1$, that the experience should transition to state $235_2$ containing components $240_2$ and $240_3$. The workflow metadata 225 further specifies state transitions that occur in connection with each of the components until an end state 245 is reached. In some embodiments, the end state 245 is associated with the outcome 215. Although FIG. 2 shows an example in which the workflow metadata 225 has one end state 245, it should be understood that there may be more than one end state 245, depending on the implementation. It should be understood that the example shown in FIG. 2 is merely one example of an experience design metadata, and it would be expected that different experience designs could vary considerably from the example shown in FIG. 2. Additionally, while FIG. 2 shows the example workflow in the form of a graph, the workflow may also be specified in a textual manner, for example in a plain text language file.

Once the user experience design 170 has been created, the EDCMS 195 accesses and obtains a copy of the user experience design 170 from the design system 100. As used herein, the term "user experience definition 175" is used to refer to a set of one or more files that are associated with the user experience design 170, and which are retrieved by the EDCMS 195 from the external design system 100 after the user experience design 170 has been created on the external design system 100. The particular format of the files which comprise the user experience definition 175 will depend on the syntax used by the external design system 100 to describe the user experience design 170. In some embodiments, when the user experience definition 175 is retrieved by the EDCMS 195, the EDCMS checks for the presence of the required experience metadata 250 and, if any user experience metadata 250 is missing, prompts are generated via user access interface 155 to request that the experience metadata 250 be added to the user experience definition.

In some embodiments, the implementation layer processes the user experience definition 175 to create a comprehensive user experience specification 180. The implementation layer, in some embodiments, includes a persona and outcome mapping and normalization subsystem 110, a finite state machine (FSM) generation subsystem 115, a consistency checking and annotation subsystem 120, a component and style capture subsystem 125, and a specification capture subsystem 130. Although FIG. 1 shows the user experience definition 175 being input to the persona and outcome mapping and normalization subsystem 110, it should be understood that the user experience definition 175 may be simultaneously input to each of the subsystem 110, 115, 120, 125, 130 at the same time. Likewise, although FIG. 1 shows arrows extending between the subsystem 110, 115, 120, 125, 130 from top to bottom, it should be understood that the subsystems may be used in any order, and that the subsystems may process the user experience definition 175 independently, depending on the implementation.

In some embodiments, the outcome mapping and normalization subsystem 110 captures the target persona from persona metadata 205 and the target outcome from outcome metadata 215 and translates the persona 205 and outcome 215 into a standard taxonomy of personas and outcomes. For example, if the target persona specified in persona metadata 205 of the user experience definition 175 was "sys admin", and the standard taxonomy included "system administrator" as one of the standard personas, the outcome mapping and normalization subsystem 110 would change the experience metadata 250 such that the experience metadata 250 in the comprehensive user experience specification 180 referred to the intended persona using the term "system administrator". In some embodiments, the persona and outcome mapping and normalization subsystem 110 uses data and textual analytic techniques to implement the mapping and normalization of persona metadata 205 and outcome metadata 215.

In some embodiments, the finite state machine generation subsystem 115 uses the knowledge of the start state 230, incrementally captures state transition events and actions, incrementally captures the contents of each state, and incrementally captures the variable/invariable nature of each state. In some embodiments, the finite state machine generation subsystem 115 uses the workflow metadata 225 to build a Mealy machine, in which state transitions depend on the current state plus inputs, or a Moore machine, in which state transitions do not depend on the inputs, but only depend on the current state, and produces a formal, intermediate representation of a finite-state machine. In some embodiments, the finite state machine generation subsystem 115 also runs one or more sanity checks on the finite state machine, to ensure that the finite state machine meets a set of pre-requisite properties for experience designs. Example sanity checks might include a set of Boolean rules, such as "before a page loads, x event is required to happen."

The consistency checking and annotation subsystem 120, in some embodiments, determines which elements of the user experience definition 175 are variable, and which are absolutely required, and annotates the comprehensive user experience specification 180 to indicate which elements are able to be varied by the engineers when implementing the comprehensive user experience specification 180. For example, in FIG. 2, each state has a variability V specified, which indicates whether and to what extent the particular state is variable or whether any of the components of the state are variable. An example variability measure may be to specify that the particular color that was selected is variable, such that the component or the state may be adjusted to automatically use one of a standard set of colors. Another example variability measure may be to allow for some latitude as to the particular placement of the component on the interface design. The consistency checking and annotation subsystem 120, in some embodiments, uses this variability information as well as heuristics, to annotate which aspects of the design are variable and by what percentage or other quantity the aspect may be varied in the final user experience. In some embodiments, the consistency checking and annotation subsystem 120 uses the same process to also check the styles of each of the states, to determine whether the styles used in each of the states are variable. Style consistency and annotation can be implemented for each state as well, and can be implemented at the same time as the components are processed by the consistency checking and annotation subsystem 120 or can be processed separately from the components.

The component and style capture subsystem 125, in some embodiments, conducts either a depth-first or breadth-first walk of the finite state machine graph, marking visited states along the way, to identify all components of the finite state machine. The component and style capture subsystem 125 compares the components used in the finite state machine with a store of known components in database 150 and, if a new component is detected that is not contained in the store of known components, adds the new component to the store of known components. In this manner, a store of known components can be incrementally built over time by the EDCMS 195. In some embodiments, the data store of known components is used by the consistency checking and annotation subsystem 120 (described above) when checking components of a user experience definition 175 for consistency with previous versions of the same components. Components in the data store of known components may be indexed, within the namespace of the experience at hand, as well as by its version, signature, and other unique fields, depending on the implementation. In some embodiments, if a component or style in the experience definition matches a known component or style in the data store of known components or styles, the correspondence is noted in the comprehensive user experience specification.

In some embodiments, the EDCMS 195 includes a specification capture engine 130. In some embodiments, this subsystem is configured to convert all parts of the comprehensive user experience specification 180, from the persona and mapping normalization subsystem, the finite state generation subsystem 115, the consistency checking and annotation subsystem 120, and from the component and style capture subsystem 125, into a standard versioned stylized, codified specification. The specification, in some embodiments, is expressed in human-readable and machine-readable languages and includes, for example, HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

In some embodiment, a package generation and encoding subsystem 135 encodes the comprehensive user experience specification 180 as well as artifacts received from each of the implementation subsystems. In some embodiments, the package generation and encoding subsystem 135 operates in a request/response manner with each of the subsystems 110, 115, 120, 125, 130, to capture partial results and store the partial results in database 150. The package generation and encoding subsystem 135 also packages the comprehensive user experience specification 180 to enable all aspects of the comprehensive user experience specification 180 to be included in the codified user experience design 185.

In some embodiments a signature marking and versioning subsystem 140 receives the comprehensive user experience specification 180 and signs and versions the comprehensive user experience to create a versioned and signed codified experience specification. In some embodiments, the signature is implemented using a hash to create a digital signature that is virtually guaranteed to be universally unique. An example hash might be implemented, for example, using a Secure Hash Algorithm such as SHA-256, which creates a 32-byte hash signature. Other hash algorithms may similarly be used, depending on the implementation. In some embodiments the versioning process assigns a version number to the versioned and signed codified experience specification 190 to enable each version of a given user experience design to be specifically identified. Example version number might be 1.1, 1.2, 1.2.1, etc., depending on the implementation. In some embodiments, the user is prompted to provide input as to how the user experience design should be versioned. The package, its signature, and its version identifier, constitute a unique artifact for a particular experience design. Any future change to the design will result in a new signature and a new version number, to enable all versions of the user experience design to be uniquely identified within the user experience design repository 145.

Figure 3:
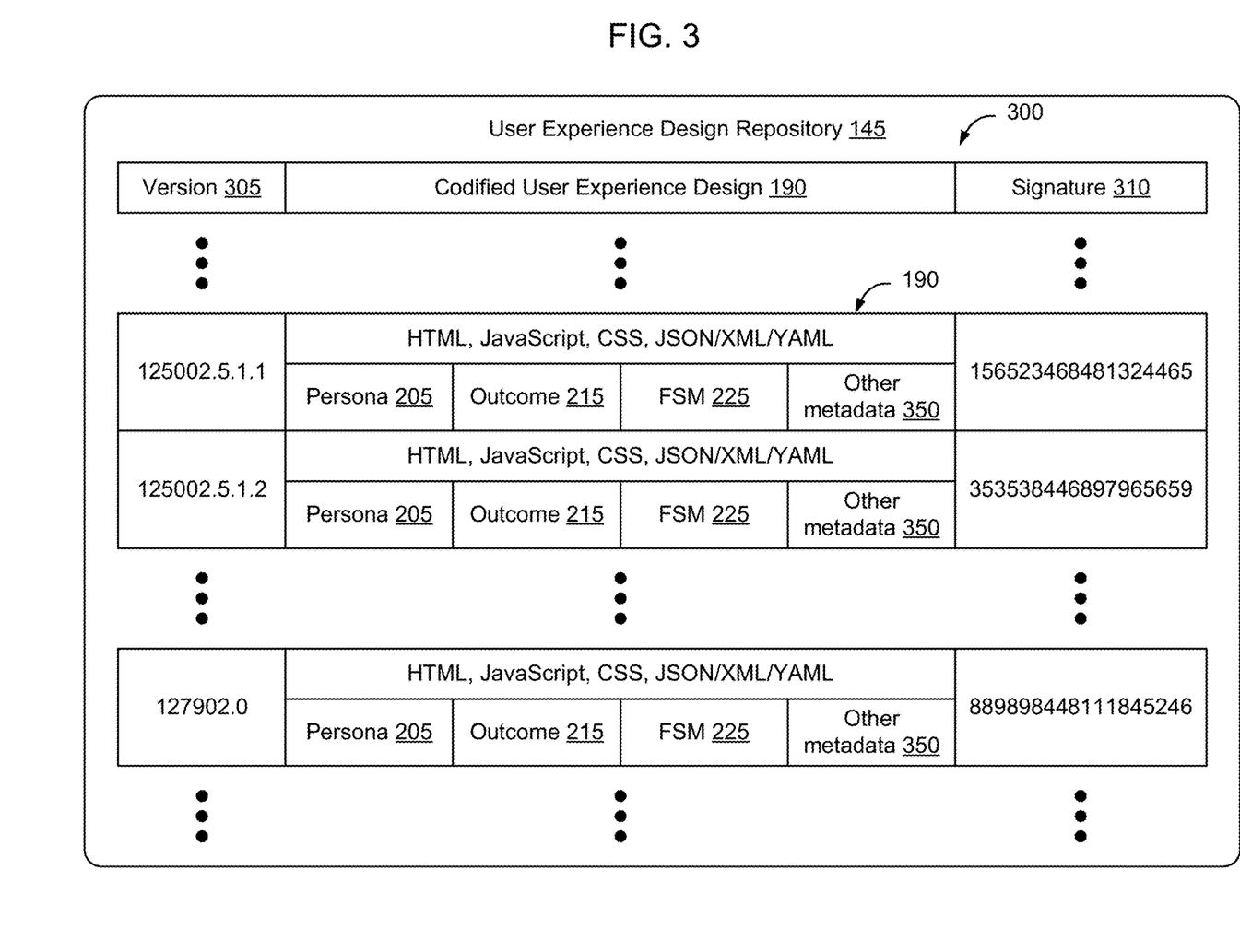
FIG. 3 is a functional block diagram of an example data structure configured to implement a codified user experience design repository of the EDCMS of FIG. 1, according to some embodiments.

Codified user experience designs 190, in some embodiments, are stored in a user experience design repository 145. FIG. 3 is a functional block diagram of an example data structure configured to implement a user experience design repository 145 of the EDCMS of FIG. 1, according to some embodiments. As shown in FIG. 3, in some embodiments the user experience design repository 145 includes a data structure 300 having entries containing versioned and signed codified experience specifications 190. Each entry has a version number 305 that uniquely identifies the experience specification 190 and a signature 310 that is able to be used to verify the content of the experience specification 190. The user experience specification includes the experience metadata 225, such as persona 205, outcome 214, finite state machine 224, annotations, and the other experience metadata described in connection with FIG. 2. The user experience specification also includes the HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

As discussed in greater detail herein, in some embodiments the EDCMS includes an automatic template and logic generator 400 configured to use the codified user experience design and generate a full, versioned pattern implementation in a web framework such as Angular, React, Vue, or micro frontend of the user experience design 170 that is to be implemented. In some embodiments, the finite state machine is used to define a pattern for the software, to generate JSON, XML, or YAML code specifying the states of the software and the transitions between states. Objects encountered at the states are used to identify API calls, which are built at the object location in the user experience design. The API calls are also aggregated to build a backend layer, to thereby automatically build both a front-end layer and back-end layer based on the codified user experience design.

Figure 4:
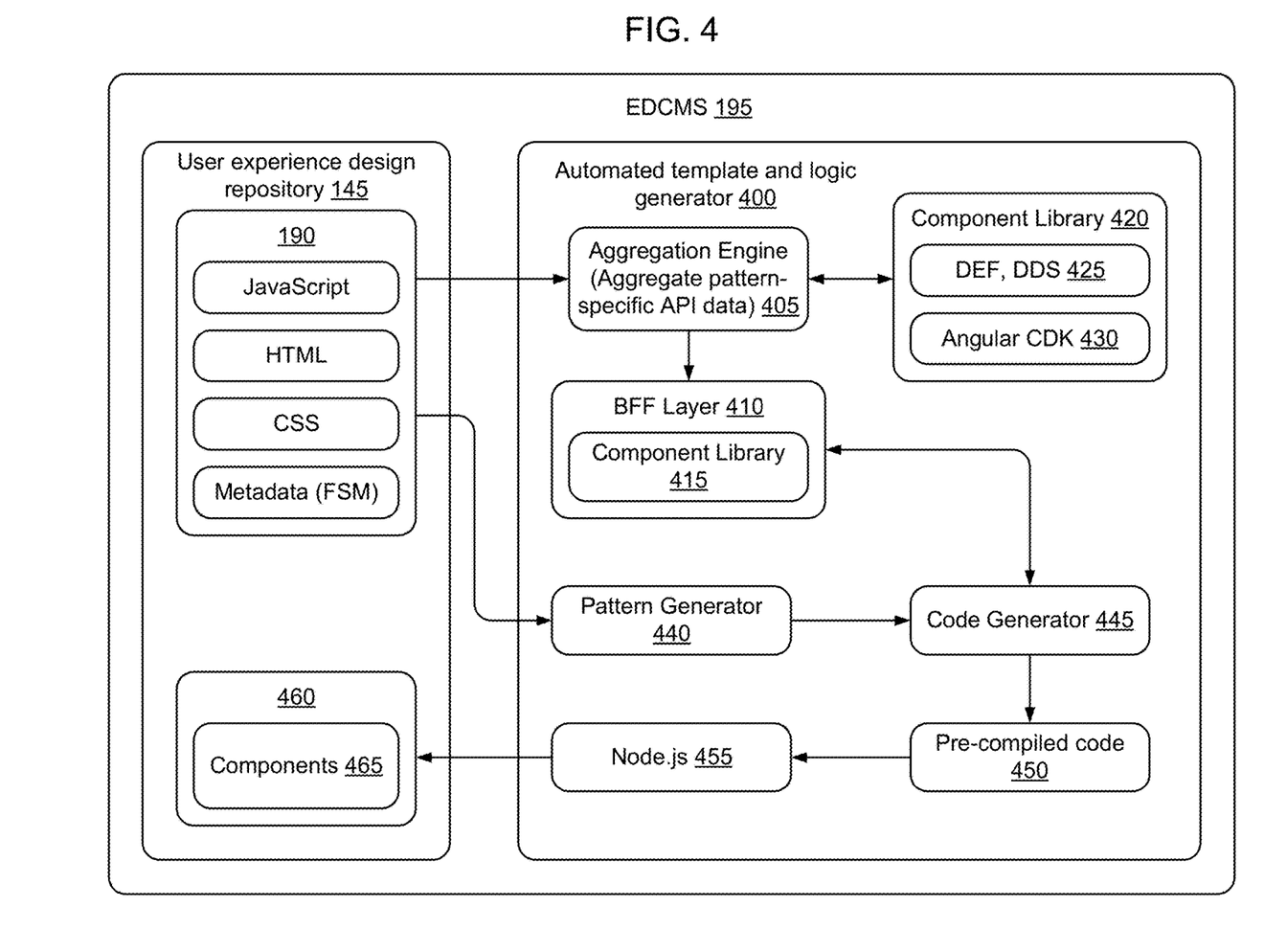
FIG. 4 is a functional block diagram of an example EDCMS system configured to automate template and logic generation from a codified user experience design, according to some embodiments.

FIG. 4 is a functional block diagram of an example EDCMS system configured to automate template and logic generation from a codified user experience design, according to some embodiments. As shown in FIG. 4, in some embodiments the EDCMS 195 includes an automated template and logic generator 400 configured to build a Back-end for Front-end (BFF) layer 410 and configured to generate precompiled code corresponding to codified user experience design.

The codified user experience design specifies the graphical elements that a user interacts with to achieve the outcome associated with the user experience design. The user experience design also includes a finite state machine that specifies the transitions between states of the graphical interface, as the user selects particular options within the user experience design. However, the objects associated with the user experience design are not linked to particular functions when the user experience design is first created. Accordingly, although the user experience design specifies the user to click through the user experience and enter various pieces of information, the objects of the codified user experience design need to be linked to particular function calls to enable the codified user experience design to contain logic that can be used to enable the user experience design to be used to functionally interact with and control operation of an application. Additionally, a back-end layer needs to be built for the user experience design, to ensure that the back-end layer contains all the functionality required to enable the function calls to be executed on the underlying system. According to some embodiments, the automated template and logic generator 400 is configured to build both the back-end layer and the front-end layer to enable the user experience design to be used to functionally interact with and control operation of an application to achieve the outcome associated with the codified user experience design.

As shown in FIG. 4, in some embodiments the automated template and logic generator 400 includes an aggregation engine 405 configured to aggregate API data from a finalized user experience design and use the API data to build a BFF layer 410. A back-end layer is a layer that is used to enable a front-end to control operation of a device such as a storage system. The back-end layer must include an Application Programming Interface (API) for each function that the front-end wants to perform, to thereby enable the back-end to implement the correct functional call to the underlying hardware. Rather than building a back-end independent of the front-end, in some embodiments the back-end layer is built specifically for the front-end application that is to be used to interface with the underlying hardware. By building a back-end layer specific for the front-end layer e.g., a Back-end layer that was built for the front-end (Back-end For Front-end or BFF layer 410), it is possible to ensure that the back-end layer has all of the APIs required by the front-end remain consistent, thereby ensuring correspondence between the back-end and front-end layers.

According to some embodiments, the automated template and logic generator 400 includes an aggregation engine that receives a copy of the codified user experience design, walks the finite state machine to determine which API calls are made by the various components of the codified user experience design, and aggregates the API calls to generate a BFF layer 410.

Figure 5:
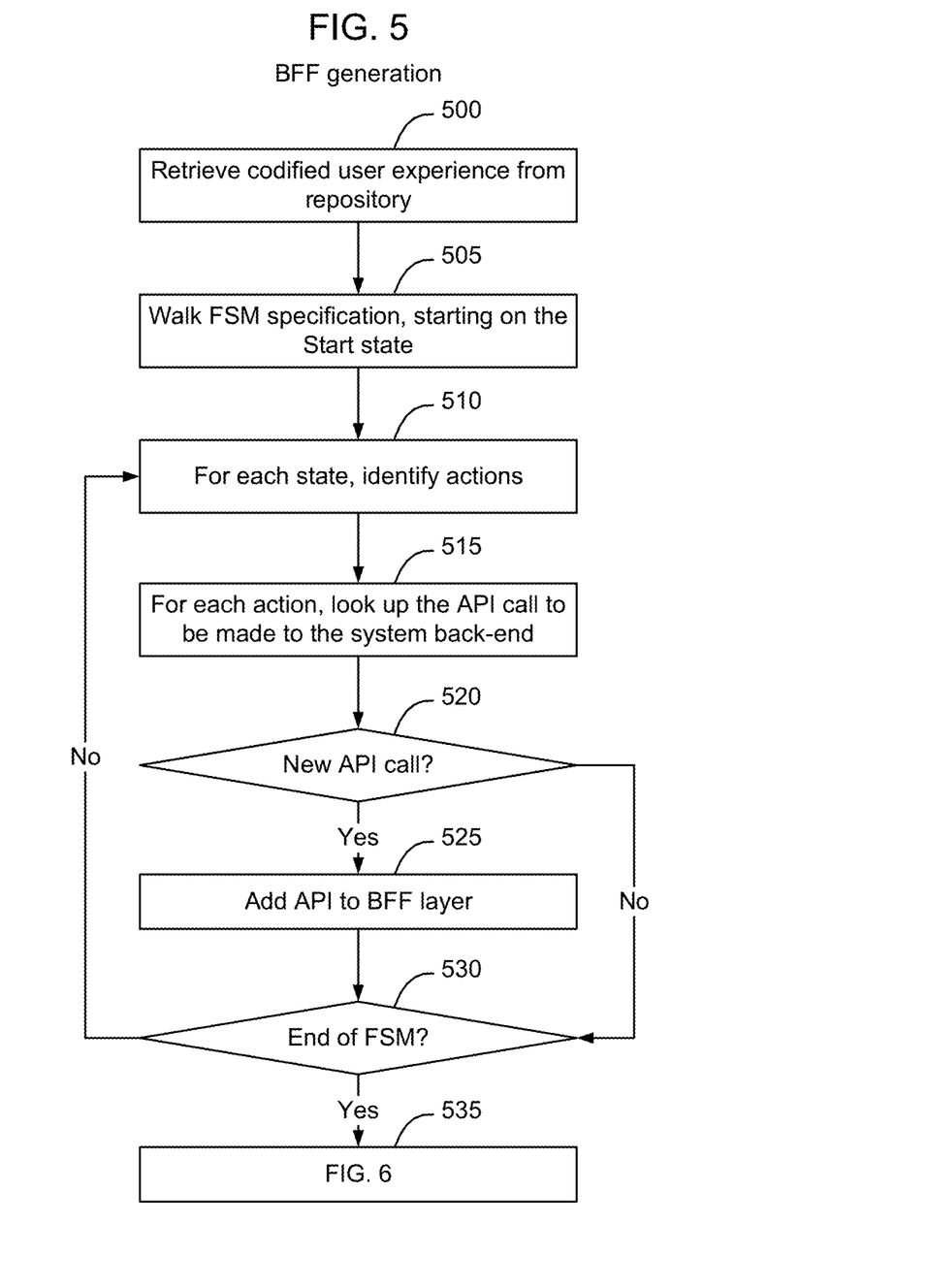
FIG. 5 is a flow chart of an example process of creating a Back-end For Front-End (BFF) layer from a codified user experience design, according to some embodiments.

FIG. 5 is a flow chart of an example process of creating a Back-end For Front-End (BFF) layer 410 from a codified user experience design, according to some embodiments. As shown in FIG. 5, in some embodiments the aggregation engine 405 retrieves the codified user experience design from the user experience design repository 145 (block 500). The codified user experience design includes a finite state machine, as well as a set of objects and annotations that specify actions at each state. Example actions might include, for example, a button click on an object, entry of a value of a parameter in a particular field, etc. In some embodiments, the aggregation engine 405 uses the object names and object annotations to identify objects present on the graphical experience design in the selected state, and uses the object names and object annotations to identify the actions associated with the state.

The aggregation engine 405 walks the finite state machine in a breadth first or depth first manner (block 505) to visit each state of the finite state machine, and identifies actions implemented in each of the states. The aggregation engine 405 marks each visited state, and continues visiting states of the finite state machine until all end states of the finite state machine have been reached. As objects are encountered, corresponding components are identified in a component library 420 and used to build a component library 415 for the BFF layer. Code generator 445 uses the component library 415 to build the front-end layer, which may be done separate from creation of the BFF layer or may be implemented concurrently with creation of the BFF layer.

As shown in FIG. 5, in some embodiments, for each state, the aggregation engine identifies the objects in that state, which are used to identify corresponding components from component library 420. The components define the actions that occur in that state (block 510). For each action, the aggregation engine looks up the API call that is required to be made to the system back-end to implement the action (block 515) and adds the corresponding API to the BFF layer. In some embodiments, when the aggregation engine 405 determines that there is an object associated with a state, the aggregation engine 405 identifies the component associated with the object in one of the libraries of the component library 420 and determines the API associated with the component that is required to be used implement the action associated with the object on the underlying system (block 515).

The component library, in some embodiments, contains one or more libraries such as a first library 425 based on the Dell Enterprise Framework (DEF), and a second library 430 based on the Angular Component Development Kit (CDK) 430. The component library 420 may include multiple component libraries depending on the implementation.

In some embodiments, when a design professional is creating a user experience design, the design professional will name the objects in the design using a naming convention that maps in a one-to-one manner to a particular component in one of the libraries contained in component library 420. For example, objects that are added to the codified user experience design may be named using a set of names specified in an experience design group. Example object names might be "masthead", "App Frame", "Side Navigation", "Status Bar", "DataGrid", "header", etc. Each of these object names corresponds on a one-to-one basis to a particular component in the component library 420. In some embodiments, annotations associated with the objects may also be used to select components that correspond with objects in the codified user experience design from the component library 420. When the aggregation engine determines that the codified user experience design contains a particular object, it maps the object name to the corresponding component. When the component requires implementation of a API call, the aggregation engine identifies the API call and adds the corresponding API to the BFF layer 410.

Although FIG. 4 shows the component library 420 as residing within the automated template and logic generator 400 for ease of illustration, it should be understood that the component library 420 might be maintained outside of the EDCMS 195 and outside of the automated template and logic generator, depending on the implementation.

A determination is then made as to whether the API is a new API, or whether the API has previously been added to the BFF layer 410 (block 520). If the API is a new API (a determination of YES at block 520) the API is added to the BFF layer 410 (block 525). If the API is not a new API (a determination of NO at block 520), the BFF layer 410 already includes the API, and the aggregation engine moves to the next state of the FSM. In some embodiments, the aggregation engine 405 walks the FSM in a breadth first or depth first manner, marking visited states, to aggregate APIs to create the BFF layer 410. Specifically, in some embodiments the aggregation engine determines if it has reached the end of the FSM (block 530). A determination that the aggregation engine 405 has reached the end of the FSM may be implemented, for example, by gathering all states, iterating through the states, marking each state visited, and determining when the aggregation engine 405 has marked all states of the FSM as visited. If the aggregation engine 405 has not processed all states of the FSM (a determination of NO at block 530), the aggregation engine 405 moves to a next state and continues building the BFF layer 410. If the aggregation engine has processed all states of the FSM (a determination of YES at block 530) the BFF layer 410 is complete and the process of building the BFF layer 410 ends.

In some embodiments, in addition to aggregating APIs to create the BFF layer 410, as objects are encountered and components are selected, the components are added to a component library 415 that is created for the BFF layer. The component library 415 thus includes a subset of components selected from the component library 420, which are known to be supported by the BFF layer 410.

Once the BFF layer 410 has been built, or while the BFF layer 410 is being built, the automated template and logic generator 400 also sets an architectural flow for the software that is to be created from the codified user experience design, and then builds the software based on the architectural flow. In some embodiments, the architectural flow of the software is based on the states and state transitions contained in the finite state machine.

Figure 6:
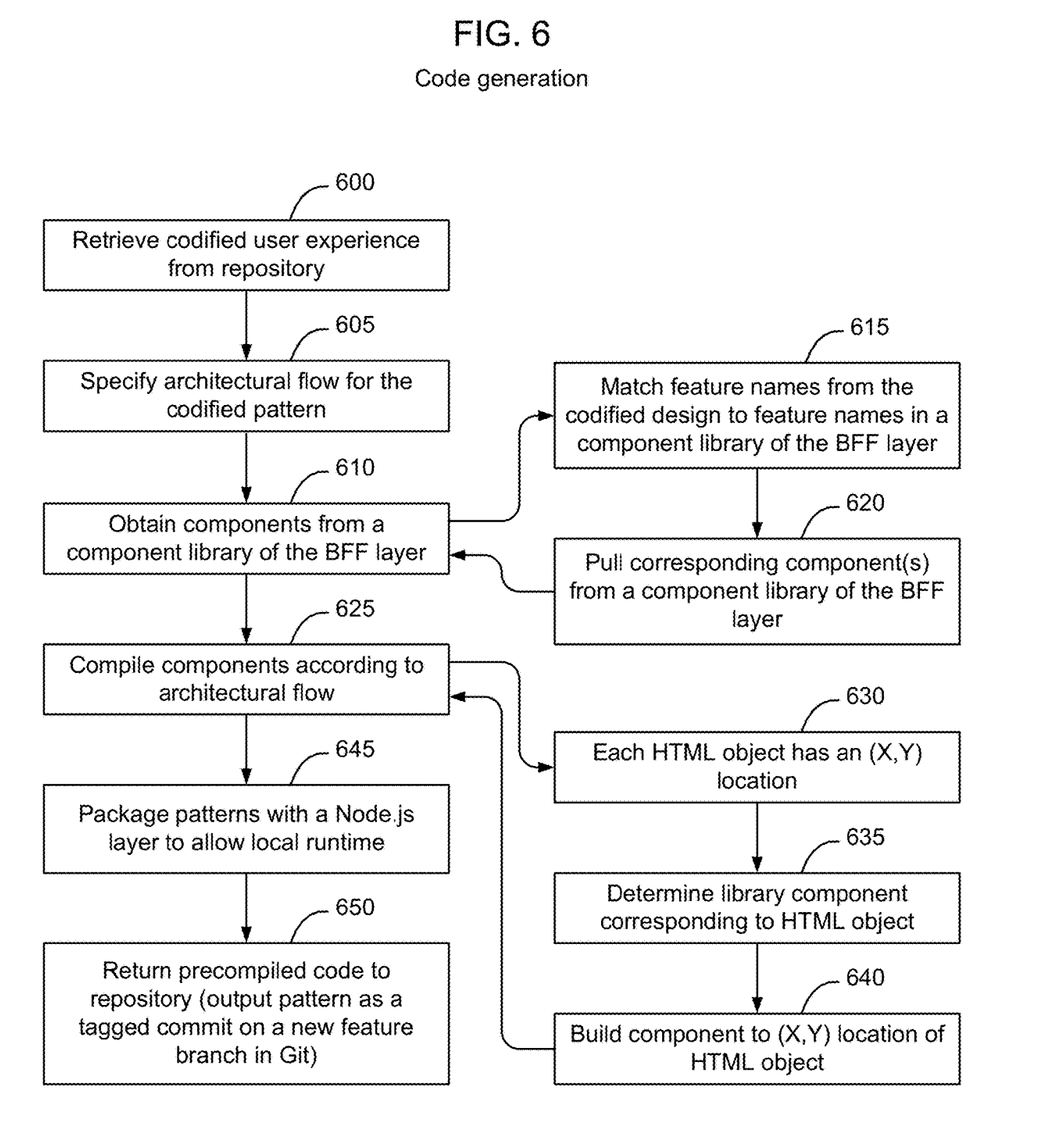
FIG. 6 is a flow chart of an example process of automating template and logic generation from a codified user experience design, according to some embodiments.

The process then continues to FIG. 6 in which the automated template and logic generator 400 creates a template for the codified user experience and uses the component library 415 to build code corresponding to the codified user experience design (block 535).

FIG. 6 is a flow chart of an example process of automating template and logic generation from a codified user experience design, according to some embodiments. As shown in FIG. 6, in some embodiments a pattern generator 440 is used to set an architectural flow for the software that is to be created from the codified user experience design, and then a code generator 445 is used to build the software based on the architectural flow.

In some embodiments the process of generating a front-end for based on the codified user experience design starts by retrieving the codified user experience design from the user experience design repository (block 600).

To generate the required logic that will enable the codified user experience design to interact with and be used to control operation of the intended software application, the automated template and logic generator 400 includes a pattern generator 440 configured to read the FSM of the codified user experience and, using the FSM, to specify an architectural flow for the software design (block 605).

Based on the software design pattern provided by the pattern generator 440, a code generator 445 identifies objects in the codified user experience design, and obtains corresponding components from the component library 415 of the BFF layer 410 (block 610). For example, in some embodiments the code generator matches feature names of the objects in the codified user design (block 615), and based on the feature name obtains the corresponding component from the component library 415 (block 620). In some embodiments, annotations associated with the objects are also used in connection with selection of corresponding components from the component library 415.

In some embodiments, when the aggregation engine 405 selects components from component library 420 for particular objects, the aggregation engine 405 adds an annotation to the object in the codified user experience design identifying the component that was selected as corresponding to the object. When the code generator 445 encounters the object, the code generator reads the annotation and uses the annotation to select the corresponding component from the component library 415. In this manner the aggregation engine 405 and code generator 445 are assured to consistently implement object/component correlation.

The components are then compiled according to the architectural flow (block 625). For example, in some embodiments each object has a set of properties. Example properties might include an (X,Y) location of the object in the graphical user interface (if the codified user experience is GUI based), object color, object size (e.g., small, medium, large), object responsiveness to changes in screen size, etc., (block 630). These other parameters are also possible to be viewed on HTML objects, such as color, size, responsiveness to changes in screen sizes, and other styles determined by Cascading Style Sheets. Once the correct library component has been obtained for the object (block 635), the component is built to the (X,Y) location of the HTML object (block 640). This process iterates to generate pre-compiled code required to implement the objects of the codified user experience design.

The precompiled code is then packaged with a node.js layer to enable local runtime (block 645), and the packaged precompiled code is returned to the repository (block 650). For example, the packaged precompiled code (pattern) may be output as a tagged commit on a new feature branch in Git.

Figure 7A:
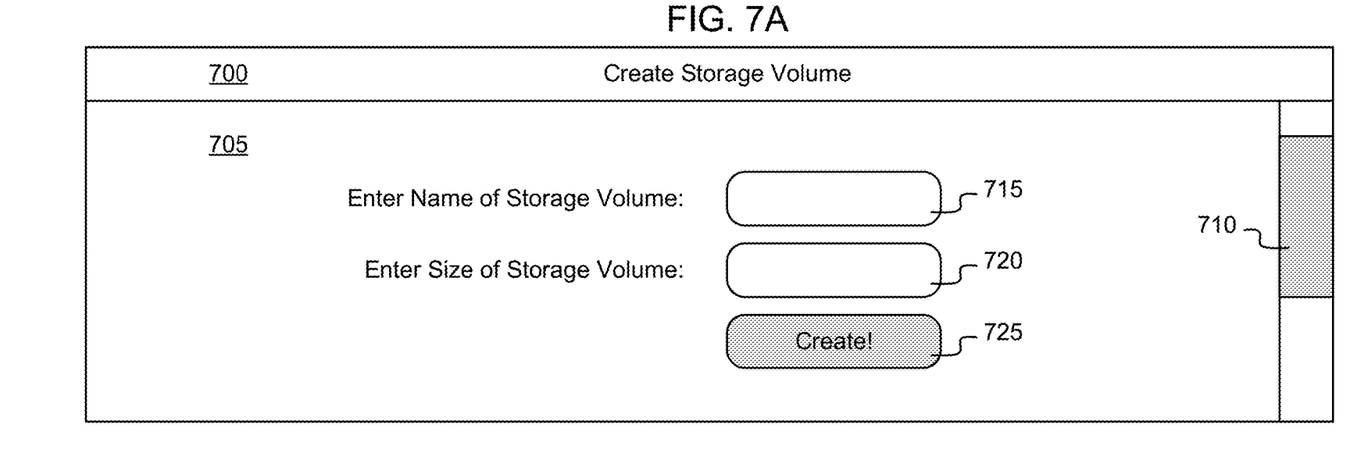
FIGS. 7A and 7B show an example of a simplified hypothetical user experience design having, as an outcome, creation of a storage volume on a storage system.
Figure 7B:
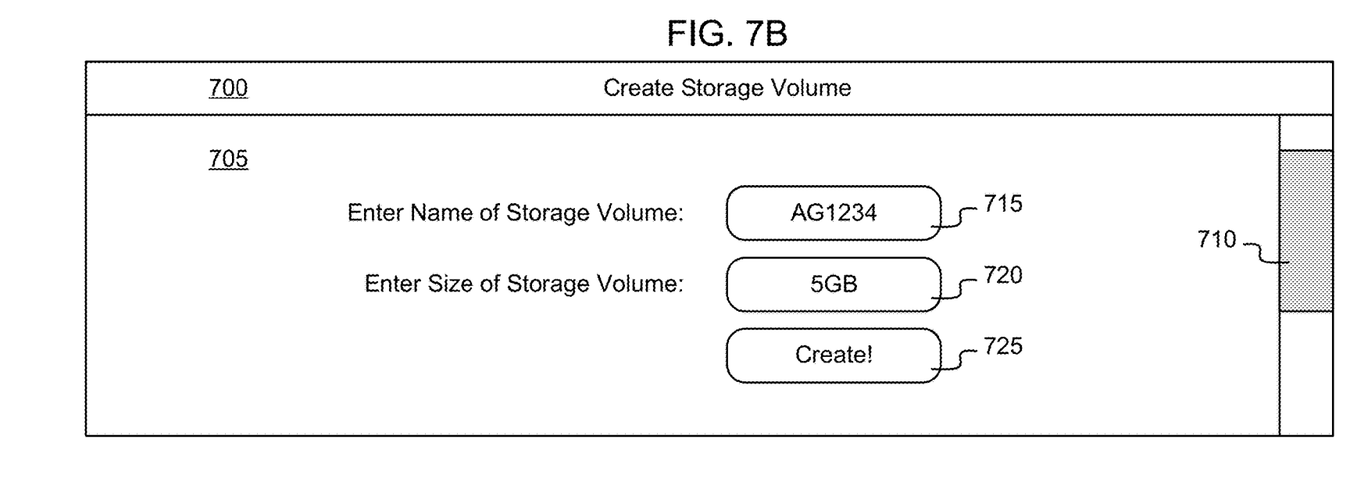

FIGS. 7A and 7B show an example of a simplified hypothetical user experience design having, as an outcome, creation of a storage volume on a storage system. The FSM of the user experience design contains two states—a first state shown in FIG. 7A in which the user is required to enter the name of the storage volume and the size of the storage volume. In the first state (FIG. 7A) the "Create!" button is grayed out, and is not able to be selected by the users. Once the user has entered values for both the name of the storage volume and the size of the storage volume, the FSM of the user experience design transitions to a second state, in which the "Create!" button is active. Upon selection of the "Create!" button, one or more program calls are made to a software application executing on an underlying storage system to cause the software application to create the requested storage volume on the storage system.

The original codified user experience design contains the HTML, CSS, and JavaScript required to create and display all of the graphical elements of both states of the graphical user interface. Example elements in FIGS. 7A and 7B include the header 700, a body 705, a slider 710, a pair of data entry fields 715, 720, and a button 725. However, these elements at this point are graphical elements, and are not connected to the underlying storage system.

To create the template and logic for the user experience design, the aggregation engine 405 will determine what API calls need to be made to the storage system, and use the API calls to create a component library 415 of the BFF layer 410. In this instance, it is assumed that one of the API is "create storage volume", and that this API includes arguments "StorageVolumeName" and "StorageVolumeSize".

Once the BFF layer 410 has been built, the pattern generator creates the software design pattern and the code generator builds components at the (X,Y) location of each of the interactive components of the user experience design. For example, input function can be built at the (X,Y) locations of each of the data entry fields 715, 720, to receive information typed by the user in those locations, and optionally to check the information entered in those locations for syntax. An input function can be built at (X,Y) location of the "create" button to detect a mouse click or touch, and upon occurrence of an input in this location, to generate and transmit the API call to the software application that is being controlled by the user interface.

By automatically creating a BFF layer containing all components required to implement actions associated with objects contained in the codified user experience design, and automatically creating an application template and generating the logic required to control the intended software application, it is possible to build and package an entire pattern based on the specifications of the codified user experience design. This allows a developer to be provided with a fully-functioning software package, including a graphical user interface, a front-end layer that has been created based on the graphical user interface, and a back-end layer that was created to contain all the required APIs to enable the front-end layer to control the intended software application. This fully-functioning package can be plugged into the product to provide engineers with a functional way to control the intended software application to implement the outcome associated with the codified user experience design, which may then be modified for product-specific use cases.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, subsystems, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of generating precompiled code from a codified user experience design, comprising:
    retrieving a codified user experience design, the codified user experience design including HyperText Markup Language (HTML), JavaScript, and Cascading Style Sheets (CSS) describing graphical aspects of the user experience design, and metadata including persona metadata, outcome metadata, and finite state machine metadata of a finite state machine, the finite state machine metadata including code that encodes logic associated with states of the user experience design and transitions between the states of the user experience design;
    walking the finite state machine in a breadth first or depth first manner to visit each of the states of the finite state machine, identifying objects in each of the visited states, and marking each of the visited states, until all end states of the finite state machine have been reached;
    for each of the identified objects, selecting a corresponding component from a component library, determining an action performed by the corresponding component, and an Application Program Interface (API) call required to implement the action;
    aggregating APIs associated with the API calls of each of the corresponding components into a back-end for front-end (BFF) layer, the BFF layer including all APIs required by the identified objects of the finite state machine; and
    generating, based on the BFF layer, precompiled code for the codified user experience design by building the corresponding components to the objects of the codified user experience design.

2. The method of claim 1, further comprising packaging the precompiled code with a node.js layer to enable local runtime of the precompiled code.

3. The method of claim 1, further comprising outputting the precompiled code as a commit on a new feature branch in Git.

4. The method of claim 1, further comprising generating a template for the precompiled code based on the finite state machine, and wherein the step of building the corresponding components comprises building each of the corresponding components to a respective location of the object in the template.

5. The method of claim 4, wherein the template is based on states and state transitions contained in the finite state machine.

6. The method of claim 1, using the aggregated API data to generate an HTML template of the corresponding components, each of the corresponding components having a corresponding location on the HTML template, to create a fully-functioning front-end layer to implement the codified user experience design.

7. The method of claim 1, wherein the objects are HTML objects having (X,Y) coordinates in a graphical user interface and styles determined by corresponding cascading style sheets, and wherein the step of generating the precompiled code comprises building the corresponding component to the (X,Y) coordinates of the HTML objects.

8. The method of claim 7, wherein the HTML objects have parameters defining colors of the HTML objects, sizes of the HTML objects, and how the HTML objects respond to changes in screen sizes.

9. The method of claim 1, wherein building the corresponding components to the objects of the codified user experience design comprises linking the objects to corresponding API calls of the BFF layer.

10. The method of claim 1, wherein the BFF layer includes only APIs required by the identified objects of the finite state machine.

11. The method of claim 1, wherein selecting the corresponding component from the component library comprises identifying feature names of the objects in the codified user design and determining components from the component library that correspond with the feature names.

12. The method of claim 11, wherein selecting the corresponding component from the component library further comprises determining annotations associated with the objects, and using the annotations to select corresponding components from the component library.

13. The method of claim 1, wherein the step of selecting a corresponding component from a component library comprises, for each identified object, annotating the identified object in the codified user experience design with a name of the corresponding selected component in the component library.

14. The method of claim 13, wherein the step of generating precompiled code comprises selecting, for each object, the corresponding component based on the name of the corresponding selected component in the component library.

* * * * *